United States Patent [19]
Joung

[11] Patent Number: 5,837,147
[45] Date of Patent: Nov. 17, 1998

[54] METHODS AND APPARATUS FOR CONTROLLING THE DRAINING OF WATER FROM A WATER PURIFIER

[75] Inventor: Geum-Suk Joung, Suwin, Rep. of Korea

[73] Assignee: Samsung Electronics Co., Ltd., Suwon, Rep. of Korea

[21] Appl. No.: 690,645

[22] Filed: Jul. 29, 1996

[30] Foreign Application Priority Data

Jul. 29, 1995 [KR] Rep. of Korea ................. 1995-23141

[51] Int. Cl.⁶ .................... B01D 17/00; B01D 17/12
[52] U.S. Cl. ................... 210/739; 210/94; 210/138; 210/175; 210/257.1; 222/146.1
[58] Field of Search .................... 251/129.01, 129.04, 251/129.15, 210; 210/85, 91, 138, 175, 248, 257.1, 257.2, 362, 321.6, 94, 739, 767; 222/1, 23, 41, 52, 54, 146.1, 189.06, 189.08, 638, 146.6; 364/502

[56] References Cited

U.S. PATENT DOCUMENTS

| | | | |
|---|---|---|---|
| 4,014,792 | 3/1977 | Gossett et al. ................. | 210/321.6 |
| 4,792,059 | 12/1988 | Kerner et al. ................. | 222/146.1 |
| 5,064,097 | 11/1991 | Brog et al. ................. | 222/146.1 |
| 5,494,573 | 2/1996 | Schoenmeyr et al. .......... | 210/257.2 |
| 5,499,197 | 3/1996 | Fou ................................ | 210/143 |
| 5,573,142 | 11/1996 | Morellato et al. .............. | 222/146.1 |

FOREIGN PATENT DOCUMENTS

WO 94/20784  9/1994  WIPO .

*Primary Examiner*—Joseph W. Drodge
*Attorney, Agent, or Firm*—Burns, Doane, Swecker & Mathis, L.L.P.

[57] ABSTRACT

A water purifier filters and stores tap water in heated and cooled tanks and selectively discharges heated or cooled water through respective dispensing pipes. If the water in the purifier is suspected of being contaminated, an electrically actuated water discharge valve is opened by means of an electric switch to drain all water from the purifier through a discharge pipe. When the switch is first manipulated, a water discharge lamp on a display flashes on and off, and a predetermined time period, e.g., three seconds, is initiated. If the user manipulates the switch a second time before the three second expires, the lamp stays on, and the water discharge valve is opened to drain all water. If the user manipulates the switch a third time, subsequent to the three-second period and before the water has been entirely drained, the water discharge valve closes.

3 Claims, 5 Drawing Sheets

METHODS AND APPARATUS FOR CONTROLLING THE DRAINING OF WATER FROM A WATER PURIFIER

BACKGROUND OF THE INVENTION

1. Field of the Invention

The present invention relates to a water purifier for removing noxious pollutant substances contained in fresh water such as tap water to purify the water, and more particularly to a water discharge control device and method for controlling the discharge of purified water.

2. Description of the Prior Art

Typically, water purifiers are used to remove noxious pollutant substances contained in fresh water such as tap water, in order to supply purified water. They are classified into a natural filtering type, a forced filtering type, an ion exchanging resin type and a reverse osmotic type in accordance with the methods for purifying water.

Water purifiers of the reverse osmotic type, which force fresh water to pass through an artificial osmotic membrane (reverse osmotic filter) while applying pressure to the fresh water, can remove heavy metals, bacteria, cancer-causing materials and the like contained in the water, thereby purifying the water. Since the reverse osmotic water purifiers can supply pure water containing only dissolved oxygen, they have been used in fields such as super-pioneering scientific industry, medical science or cleaning for super-precise electronic elements.

Recently, such reverse osmotic water purifiers have widely been used as domestic water purifiers for supplying drinkable water.

The conventional water purifiers function to filter out substances noxious to humans, such as heavy metals, bacteria, cancer-causing materials contained in fresh water such as tap water by a plurality of filters.

The water purified by the filters is stored in a main water tank, a cold water tank, and a hot water tank, respectively, to thereby be dispensed into a drinking cup through a discharge port by manipulating a water dispensing lever.

In such a conventional water purifier, all water in the purifier can be discharged through a separate discharge port if it is suspected that the water has been contaminated. This complete discharge of water, which is initiated by a water discharge switch, will occur even when the water discharge switch is pressed by mistake.

As a result, the water purifying operation must be repeated to replenish the water tank.

Therefore, to minimize the possibility of this mistaken purging of the purifier there has been proposed a water purifier in which all purified water in the water tank is discharged only when the water discharge switch is pressed over 5 seconds.

However, it is inconvenient to press the water discharge switch over 5 seconds.

SUMMARY OF THE INVENTION

Therefore, an object of the invention is to solve the above mentioned problems and to provide a water discharge control device for a water purifier and control method thereof, capable of preventing purified water from discharging when a water discharge switch is pressed by mistake.

In accordance with the present invention, this object is accomplished by providing in a water purifier including a plurality of filtering means for removing various harmful organic chemical substances, heavy metals, bacteria, cancer-causing materials and odorous substances, a water tank for storing purified water, cooling means for cooling said purified water, heating means for heating said purified water, a cold water tank for storing cold water cooled by said cooling means, and a hot water tank for storing hot water heated by said heating means, a water discharge control device comprising:

key input means including a plurality of key for establishing temperatures of cold water and worm water according to user's desire, simultaneously for establishing operation conditions and water discharge condition of the water purifier;

control means for controlling the cooling and heating operations of purified water in the cold water tank and the hot water tank according to established temperatures by manipulating a temperature establishing switch of the key input means, and for controlling the water discharge operation.

water discharge valve driving means for controlling a water discharge valve, thereby discharging purified water from the water tanks under a control of the control means; and display means for displaying the established temperatures by the key input means and for displaying the temperatures of cold water in the cold water tank and hot water in the hot water tank, respectively, and for displaying a discharge time of purified water under a control means. Only when a switch is manipulated two times within a predetermined time period will a water discharge valve be opened to drain the tanks.

Furthermore, this object is accomplished by providing a water discharge control method for a water purifier, comprising the steps of:

purifying fresh water being supplied from a faucet by a pluraly of filtering means;

changing into cold water and hot water of the purified water by cooling and heating operations;

determining whether or not a water discharge switch is pressed while producing purified water, cold water and hot water;

turning on and off a water discharge lamp for a predetermined time when the water discharge switch is pressed;

determining whether or not the water discharge switch is once more pressed while the water discharge lamp is being turned on and off;

turning on the water discharge lamp for a predetermined time when the water discharge switch is once more pressed; and discharging the water in the tanks through a water discharge valve when the water discharge lamp is turned on.

BRIEF DESCRIPTION OF THE DRAWINGS

Other objects and aspects of the invention will become apparent from the following description of embodiments with reference to the accompanyings drawings in which.

DETAILED DESCRIPTION OF A PREFERRED EMBODIMENT

Figure 1:
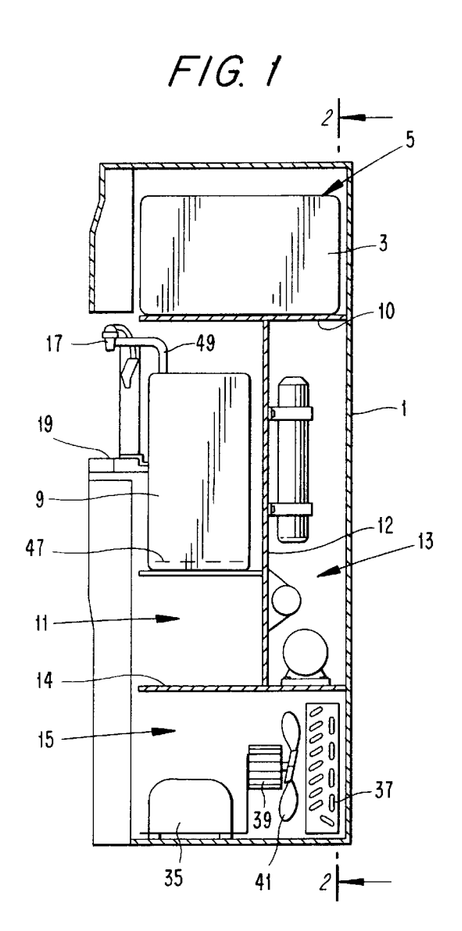
FIG. 1 is a longitudinal sectional view of a water purifier to which a water discharge control device and a control method thereof according to an embodiment of the present invention is applied.
Figure 2:
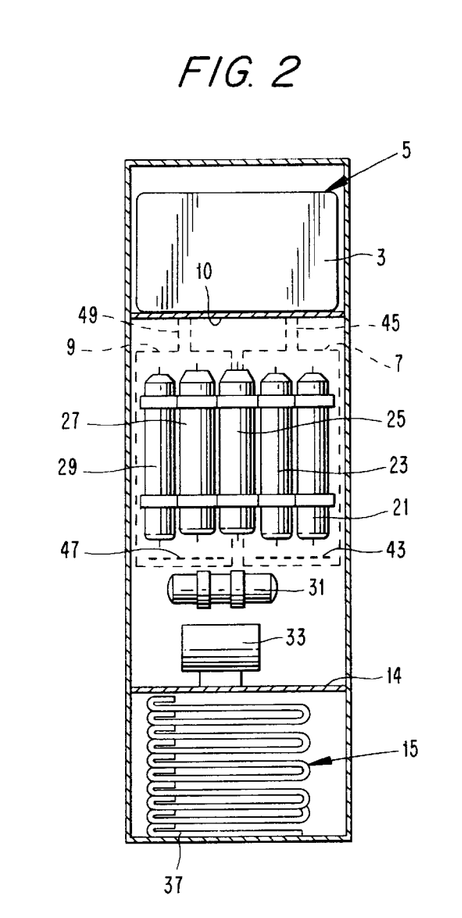
FIG. 2 is a sectional view taken along line 2—2 in FIG. 1.

In FIG. 1 and FIG. 2, a water purifier according to the present invention comprises a water purifying chamber 5 formed at upper side of a purifier body 1 for receiving a main water tank 3 for storing the purified water.

At a lower side of the water purifying chamber 5, a cold water and hot water chamber 11 is disposed which includes a cold water tank 7 and a hot water tank 9 serving to chill and heat water by heating means and cooling means, respectively.

The water purifier further comprises a filtering chamber 13 for filtering noxious pollutant substances contained in fresh water supplied from a faucet, a machine chamber 15 containing refrigerant equipment so that the purified water in the cold water tank 7 is cooled, and water discharge levers 17 disposed at the front side of the body 1 in order to cause cold water or hot water in the cold water tank 7 or hot water tank 9 to be discharged.

Inside the filtering chamber 13, a precipitation filter 21 is disposed to remove noxious pollutant substances and rust substances contained in the fresh water supplied from the faucet.

At one side of the precipitation filter 21, a pre-processing filter 23 is disposed to remove various harmful organic chemical substances and the like from the fresh water supplied from the precipitation filter 21.

At one side of the pre-processing filter. 23, membrane filters 25 and 27 are disposed which include a plurality of membranes (not shown), serving to remove heavy metals, bacteria, cancer-causing materials and the like contained in the water emerging from the pre-processing filter 23.

A post-processing filter 29 is connected to the membrane filters 25 and 27 to remove odorous substances, such as noxious gas, contained in the water emerging from the membrane filters 25 and 27.

At a lower side of the precipitation filter 21, the pre-processing filter 23, the membrane filters 25 and 27, and post-processing filter 29, an ultraviolet filter 31 is disposed to remove various harmful germs contained in the fresh water when the fresh water is passed through the filters.

A pressure pump 33 is connected between the pre-processing filter 23 and the membrane filters 25 and 27 to apply pressure to the water emerging from the pre-processing filter 23, thereby feeding the water to the membrane filters 25 and 27 at a certain pressure.

Since water under pressure is fed to the membrane filters 25 and 27 by the pressure pump 33, it can be purified by the membrane filters 25 and 27 in a reverse osmotic manner.

Inside the machine chamber 15, a compressor 35 is disposed to compress gas refrigerant of low temperature and low pressure into gas refrigerant of high temperature and high pressure.

At one side of the compressor 35, a condenser 37 is disposed to condense the gas refrigerant of high temperature and high pressure into liquid refrigerant of low temperature and high pressure.

The liquid refrigerant is produced by heat exchange between the gas refrigerant of high temperature and high pressure and outside air due to natural convention current or forced convention current.

At one side of the condenser 37, a fan 41 is disposed to be driven by a fan motor 39 so that the refrigerant is liquefied, and, at the same time the compressor 35 is cooled due to air circulation.

Meanwhile, inside the cold water tank 7 an evaporation tube 43 is disposed to cause the refrigerant flowing therein to be evaporated so that the water in the cold water tank 7 is cooled.

Cold water dispensing pipe 45 is connected to one side of the cold water tank 7 to dispense the cold water.

Inside the hot water tank 9, a heater 47 is disposed to heat the water in the hot water tank 9.

A hot water dispensing pipe 49 is connected to one side of the hot water tank 9 to dispense the hot water therein, as a passage.

The water purifying chamber 5, the cold water and hot water chamber 11, the filtering chamber 13 and the mechanical chamber 15 are partitioned by partition members 10, 12 and 14.

Numeral 19 denotes a reservoir, which is disposed at a lower side of the water dispensing lever 17, to store water which does not enter a cup when dispensing the water by manipulating the water dispensing lever 17.

Figure 3:
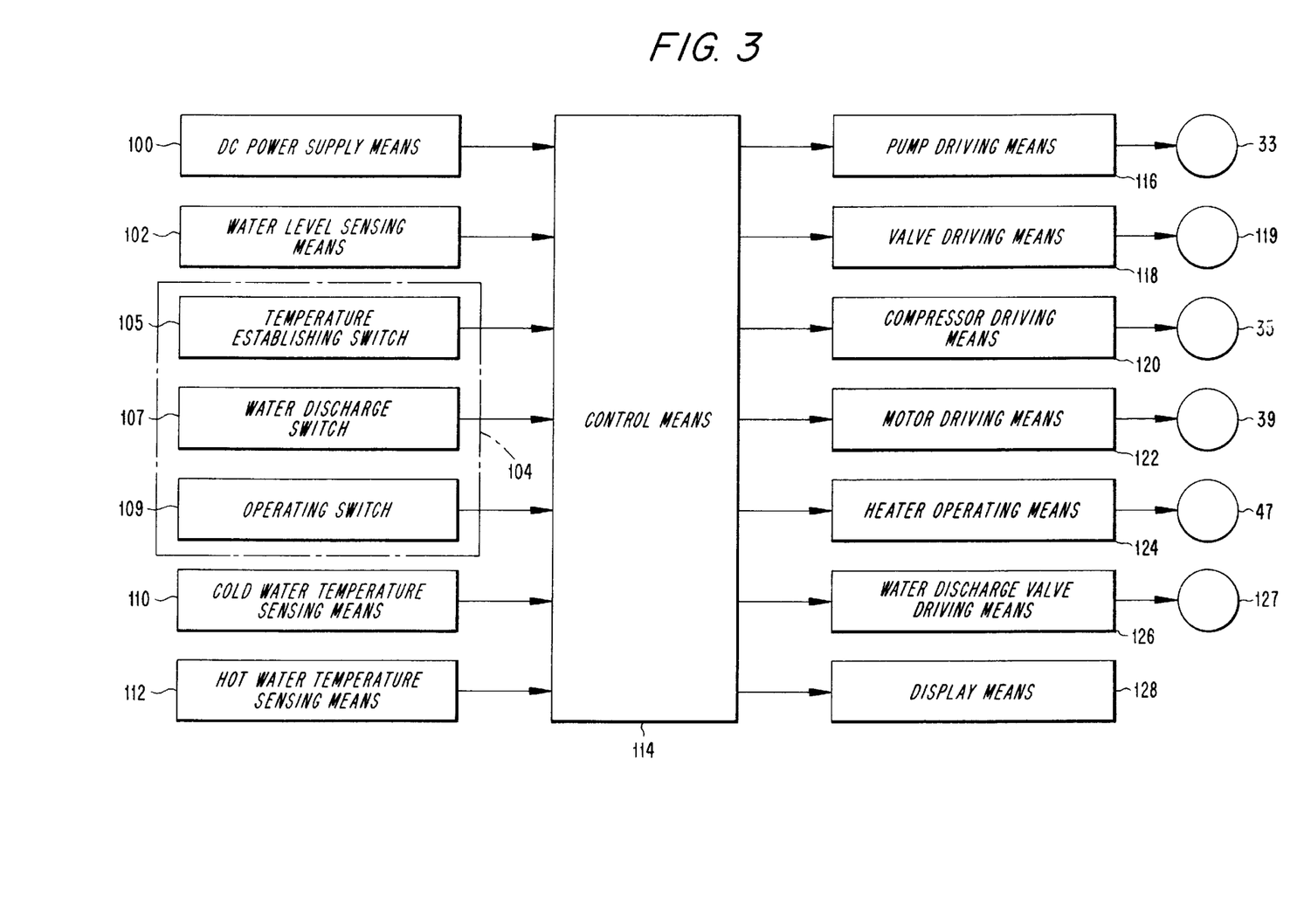
FIG. 3 is a block diagram illustrating a water discharge control system according to the present invention.

FIG. 3 is a block diagram illustrating the water discharge control device according to the present invention.

In FIG. 3, the water discharge control device includes a DC power supply means 100 for converting a source voltage from a commercial AC power source, input at an AC power input stage (not shown), into a DC voltage with a voltage level required to drive the water purifier.

The water discharge control device also includes water level sensing means 65 for sensing the amount of water level of the water tank 3.

The water level sensing means 102 comprises water level sensors which sense the full and empty water levels of the water tank 3, respectively.

Key input means 104 serves to establish data necessary to operate the water purifier.

The key input means 104 comprises a temperature establishing switch for establishing temperatures Tcs and Ths of the cold water and the hot water to be stored in the cold water tank 7 and the hot water tank 9, a water discharge switch 107 for discharging the water in the water tank 3, the cold water tank 7 and the hot water tank 9, and an operating switch 108 for supplying or interrupting a power source to the water purifier.

All the DC power supply means 100, the water level sensing means 102 and the key input means 104 are coupled to control means 114.

This control means 114 serves to receive the DC voltage from the DC power supply means 100 and to initialize the water purifier in response to the DC voltage.

The control means 114 also receives a water level sensing signal from the water level sensing means 102 and controls the overall water purifying operation of the water purifier on the basis of the water level sensing signal.

This control means also controls the temperatures of the cold water and hot water in the cold water tank 7 and the hot water tank 9 to be risen or be lowered to the user's desired temperatures, and controls the water discharging operation.

The control means 114 is a microcomputer.

Cold water temperature sensing means 110 serves to sense the temperature Tc of the cold water in the tank 7 and outputs it to the control means 114.

Warm water temperature sensing means 112 serves to sense the temperature Th of the hot water in the tank 9 and outputs it to the control means 114.

To the control means 114, pump driving means 116 is coupled which controls a pressure pump 33, which increases the pressure of water being introduced in the membrane filters 25 and 27 to a certain level, under a control of the control means 114.

The pump driving means 116 receives a control signal from the control means 114 generated in accordance with the water level sensed by the water level sensing means 102.

In accordance with the control signal, the pump driving means 116 drives or stops the pressure pump 33.

Valve driving means 118 is also coupled to the control means 114 to control a water supply valve 119.

The valve driving means 118 receives a control signal which is generated from the control means 114 in accordance with the water level of the water tank 3 sensed by the water level sensing means 102.

In accordance with the control signal, the valve driving means 118 controls the water supply valve 119 to control the supply of purified water to the water tank 3.

Compressor driving means 120 controls a compressor 35.

The compressor driving means 120 receives a control signal which is generated from the control means in accordance with a difference between the temperature Tcs which is established by the temperature establishing switch 105 of the key input means 104 and the temperature Tc of the cold water which is sensed by the cold water temperature sensing means 110.

In accordance with the control signal, the compressor driving means 120 controls the compressor 35 to control the cooling operation of the water in the tank 7.

The water discharge control device further includes motor driving means 122 to control a motor 39.

The motor driving means 122 receives a control signal which is generated from the control means 114 in accordance with a difference between the temperature Tcs which is established by the temperature establishing switch 105 of the key input means 104 and the temperature Tc of the cold water which is sensed by the cold water sensing means 110.

In accordance with the control signal, the motor driving means 122 controls the motor 39 to control the operation of the fan 41.

Therefore, a heat-exchanged air in the condenser 37 is discharged outside, and simultaneously the compressor 35 is cooled due to the operation of the fan 41.

Heater operating means 124 is also coupled to the control means 114 to control a heater 47.

The heater operating means 124 receives a control signal which is generated from the control means 114 in accordance with a difference the temperature Ths which is established by the temperature establishing switch 105 of the key input means 104 and the temperature Th of the hot water which is sensed by the hot water temperature sensing means 112.

In accordance with the control signal, the heater operating means 124 controls the heater 47 to heat the water in the tank 9.

Water discharge valve driving means 126 receives a control signal which is generated from the control means 114 in accordance with the press of a water discharge switch of the key input means 104.

In accordance with the control signal, the water discharge valve driving means 126 controls a water discharge valve 127 to discharge the water in the water tank 3, the cold water tank 7 and the hot water tank 9, e.g., if it is suspected that such water is contaminated.

The water discharge control device further includes display means 128 which receives various control signals generated from the control means 114 and displays the operation conditions respectively corresponding to the received control signals, such as, the temperatures Tcs and Ths which are established by the temperature establishing means 105 of the key input means 104, the temperatures Tc and Th which are sensed by the cold water temperature sensing means 110 and the hot water temperature sensing means 113; respectively.

Furthermore, the display means 128 turns on or off a water discharge lamp in accordance with the activation of the water discharge switch under a control of the control means 114 to display the water discharge operation of the water tank 3, the cold water tank 7 and the hot water tank 9.

The operation of the water discharge control device having the above-mentioned construction will now be described in conjunction with FIGS. 4A to 4C.

Figure 4A:
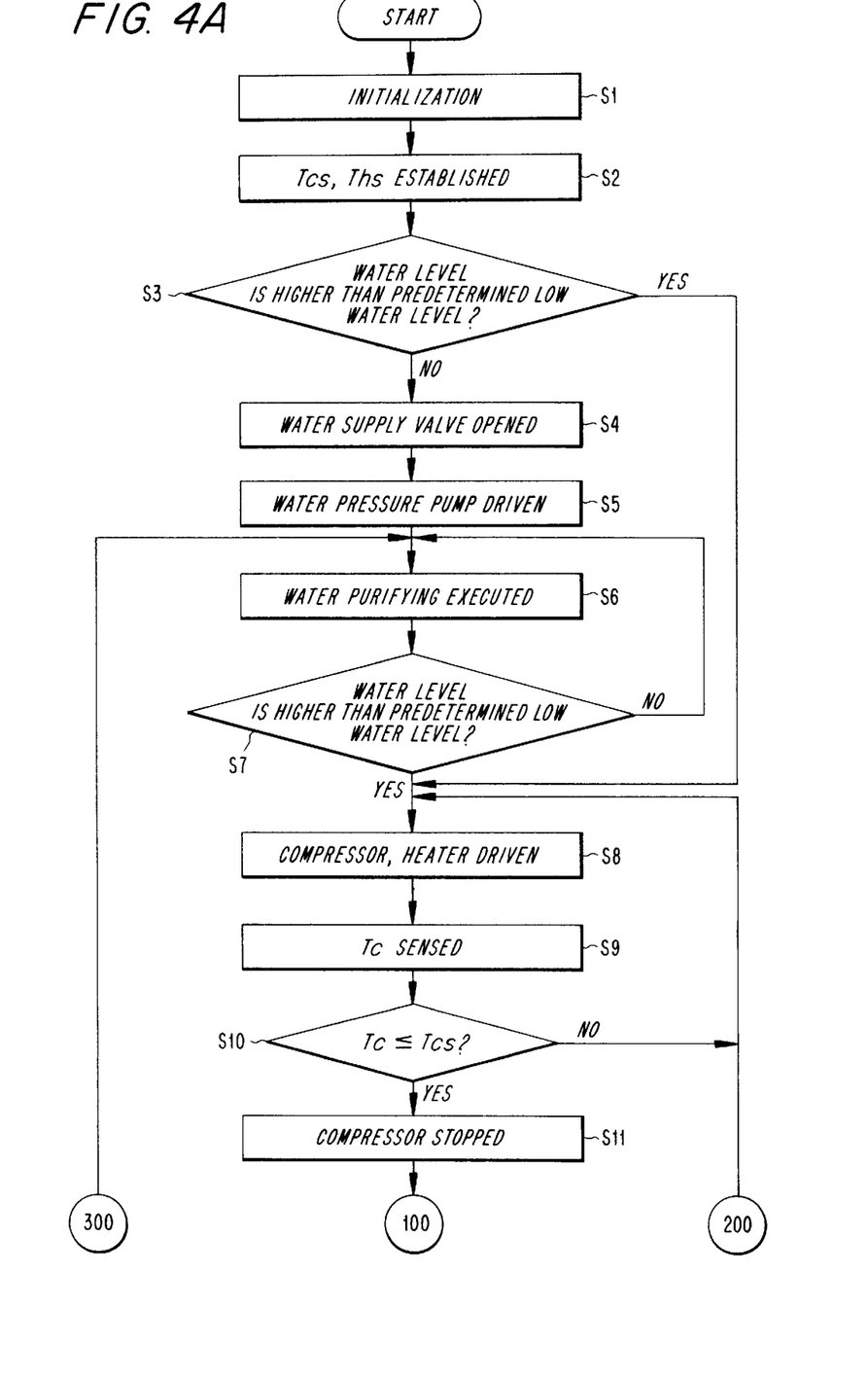
FIGS. 4A to 4C are flow charts illustrating the sequence of the water discharge control procedure executed by the water discharge control method according to the present invention.
Figure 4B:
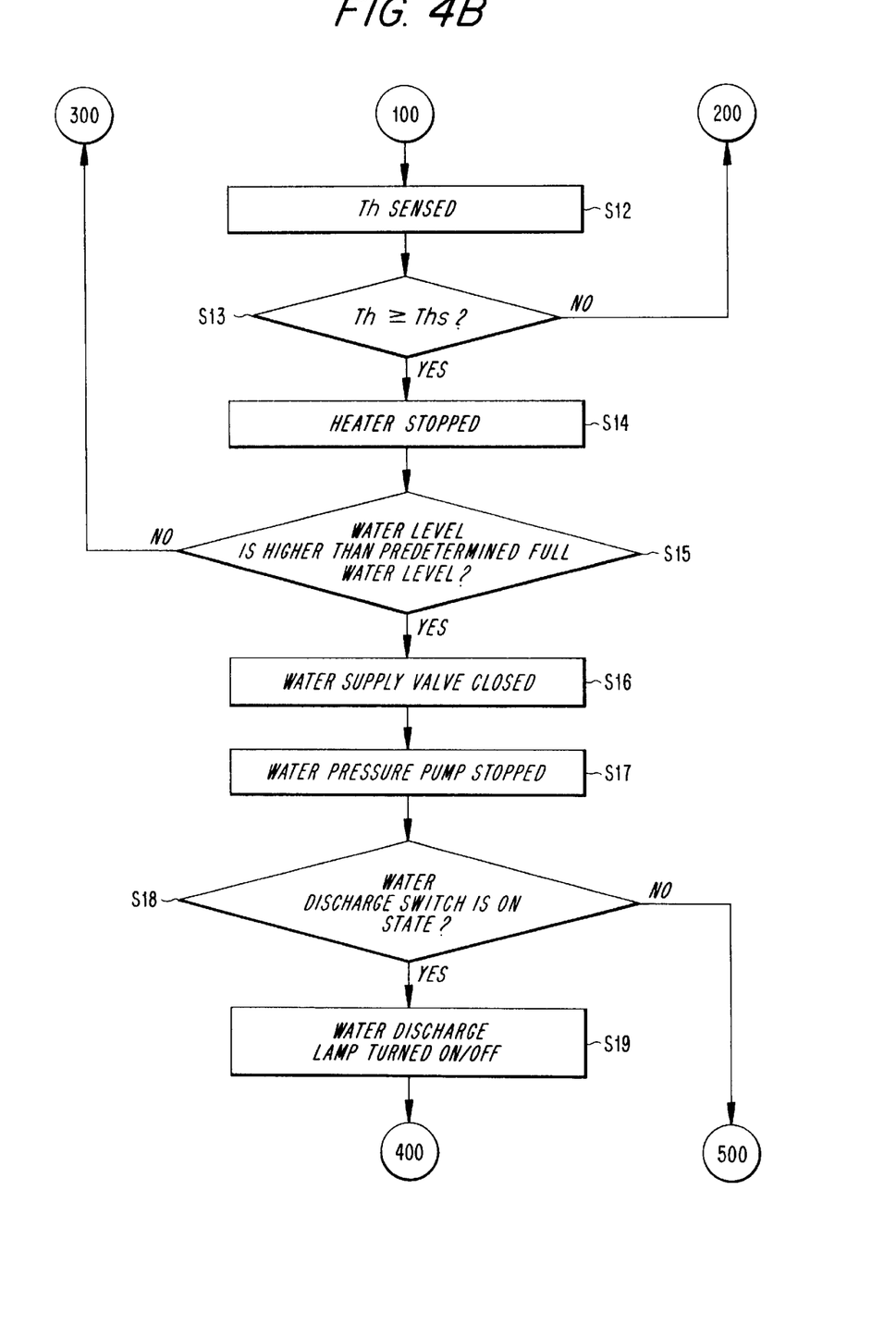
Figure 4C:
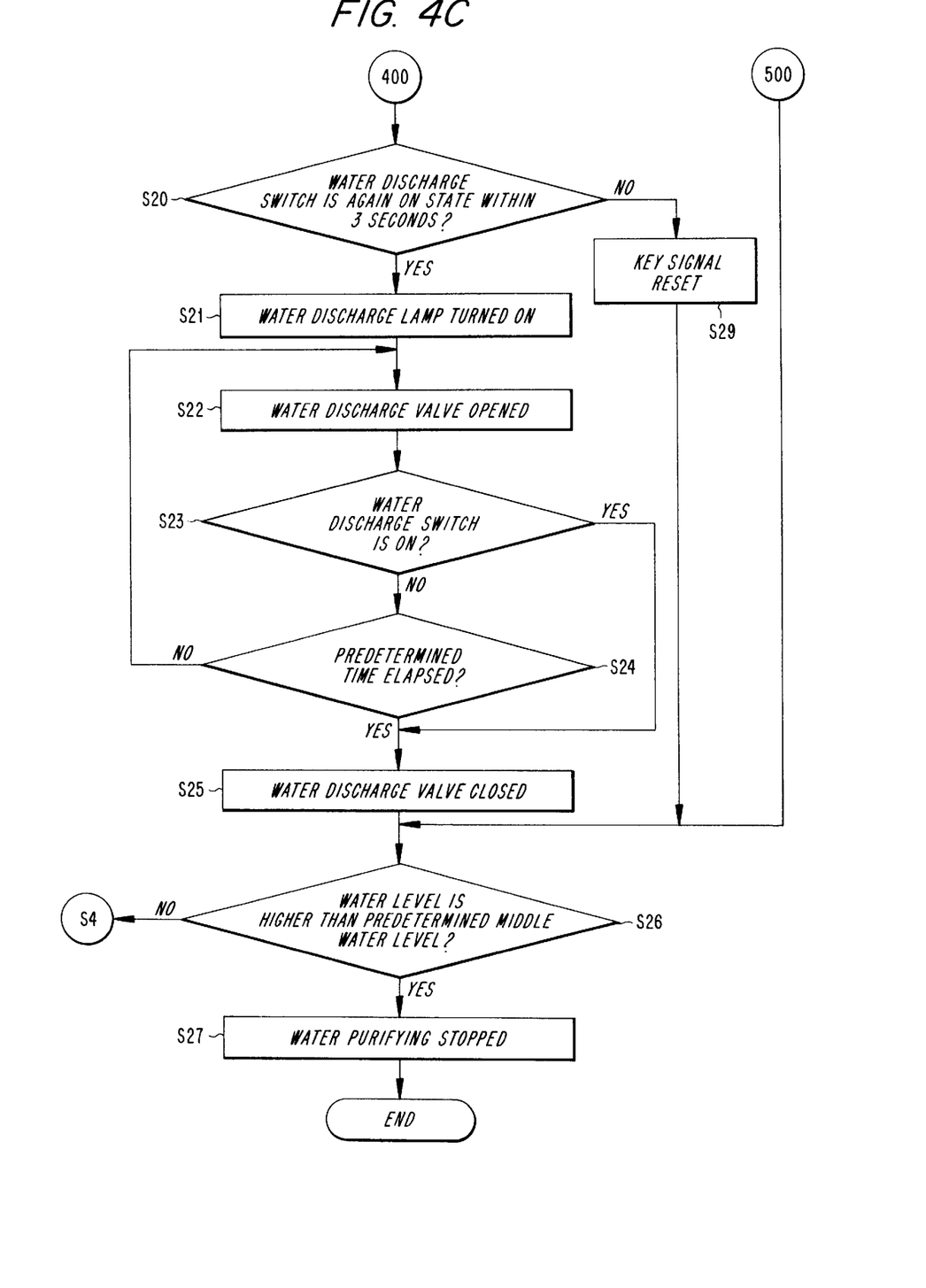

FIGS. 4A to 4C are flow charts respectively illustrating the sequence of the water discharge procedure executed by the water discharge control device according to the present invention.

Once the water purifier is powered, the DC power supply means 100 converts a source voltage received from a commercial AC power source at its AC power input stage (not shown) into a DC voltage with a voltage level required to drive the water purifier.

The DC voltage from the DC power supply means 100 is then applied to the control means 114 as well as various driving circuits.

Upon receiving the DC voltage from the DC power supply means 100, the control means 114 initializes the water purifier at atep S1.

At step S2, user presses a cold water selection switch or a hot water selection switch (not shown) of the key input means 104 to thereby be selected cold water or hot water.

The user further presses the temperature establishing switch 105 to establish a desired cold water temperature Tcs and hot water temperature Ths.

The display means 128 displays the temperatures Tcs and Ths under the control of the control means 114.

Subsequently, the operating switch 109 is turned on, and the water level sensing means 102 senses the amount of water stored in the water tank 3, namely the water level of the water tank 3.

Water level data from the water level sensing means 102 is sent to the control means 114.

It is then determined at step S3 whether or not the water level of the water tank 3 sensed by the water level sensing means 102 is higher than a predetermined low water level (about 10%, if full water level is 100%).

This determination is achieved by the control means 114 which receives a signal sensed by the empty water level sensor mounted at the inner surface of the water tank 3 and then discriminates on the basis of the received signal, whether or not the water level of the water tank 3 is higher than the predetermined low water level.

When the water level of the water tank 3 is determined at step S3 as not being higher than the predetermined low water level (namely, if NO), the procedure proceeds to step S4.

At step S4, the control means 114 applies, to the valve driving means 118, a control signal for opening the water supply valve 81 to supply purified water to the water tank 3.

Therefore, the valve driving means 118 supplies the source voltage to the water supply valve 81 under the control of the control means 114, thereby opening the water supply valve 81.

When the water supply valve 81 is opened, fresh water, such as tap water, from the faucet is supplied to the membranes 25 and 27.

At this time, the control means 114 outputs a control signal to the pump driving means 116 to drive the pressure pump 33.

Accordingly, the pump driving means 116 supplies the source voltage to the pressure pump 33 under the control of the control means 114, thereby driving the pressure pump 33.

By driving the pressure pump 33, pressure of pressure of fresh water is supplied to the membranes 25 and 27 from the faucet at a predetermined pressure.

At step S6, the precipitation filter 21 operates to remove noxious pollutant substances and rust substances contained in fresh water supplied from the faucet, and the pre-processing filter 23 operates to remove various harmful organic chemical substances such as chlorine components and the like from fresh water supplied from the precipitation filter 21.

Further, the membrane filters 25 and 27 operate to remove heavy metals, bacteria, cancer-causing materials and the like contained in the water emerging from the pre-processing filter 23, and the post-processing filter 29 operates to remove odorous substances, such a noxious gas, contained in the water emerging from the membrane filters 25 and 27.

The fresh water emerging from the post-processing filter 29 is supplied to the water tank 3 through the water supply inlet (not shown) to thereafter be supplied to the cold water tank 7 and the hot water tank 9.

Meanwhile, the ultraviolet filter 31 emits ultraviolet toward the fresh water when the fresh water travels to the precipitation filter 21, the pre-processing filter 23, the membranes 25 and 27, and post-processing filter 29.

Therefore, it is possible to remove various harmful germs such as bacteria and the like contained in the fresh water.

At step S7, the water level sensing means 102 senses the amount of water stored in the water tank 3.

Water level data from the water level sensing means 102 is sent to the control means 114.

It is then determined whether or not the water level of the water tank 3 sensed by the water level sensing means 102 is higher than the predetermined low water level.

When the water level of the water tank 3 is determined as not being higher than the predetermined low water level (namely, if NO), the procedure returns to step S6 and repeatedly executes the procedure from step S6.

On the other hand, where the water level of the water tank 3 is determined at step S7 as being higher than the predetermined low water level (namely, if YES), the procedure proceeds to step S8.

At step S8, the control means 114 applies control signals to the compressor driving means 120, the heater operating means 124 and the motor driving means 122 to control the compressor 35, the heater 47, and the fan motor 39, respectively.

In accordance with the control signals from the control means 114, the compressor driving means 120 drives the compressor 35, the heater operating means 124 operates the heater 47, and the motor driving means 122 drives the fan motor 39.

Therefore, refrigerant gas of high pressure and high temperature discharged out of the compressor 35 is cooled and liquefied in the condenser 37 to thereafter be heat-exchanged with room air by natural convection current or forced convection current by rotating the fan 41, and the liquefied refrigerant of high pressure and low temperature is in turn infused into a capillary tube (not shown).

As a result, the refrigerant liquid of high pressure and low temperature is converted into liquid of low pressure and low temperature by adiabetic expansion to thereby be infused into an evaporating tube 43. At this time, the refrigerant liquid of low pressure and low temperature is converted to refrigerant gas in the evaporating tube 43 and heat exchanged with the room air, thereby cooling purified water in the cold water tank 9.

The refrigerant liquid of low temperature and low pressure is converted to refrigerant gas in the evaporating tube 43 to thereafter be introduced into the compressor 35. Thereafter, the refrigerant gas is converted to refrigerant gas of high temperature and high pressure to thereafter repeat a cooling cycle thus described.

Meanwhile, when the heater 47 is operated, purified water in the hot water tank 9 is converted to hot water.

The water purifying operation of the water purifier is executed until the water level in the water tank 3 reaches a full water level even while purified water is cooled and heated.

At step S9, the cold water temperature sensing means 110 senses the temperature Tc of the cold water in the cold water tank 7.

Temperature data of the cold water from the cold water temperature sensing means 110 is sent to the control means 114. At this time, the display means 128 displays the temperature Tc sensed by the cold water temperature sensing means 110 under the control of the control means 114.

Thereafter, at step S10, it is determined whether or not the temperature Tc sensed by the cold water temperature sensing means 110 is lower than the established temperature Tcs established by the temperature establishing switch 105. As a result, where the temperature Tc of the cold water is determined as not being lower than the established temperature Tcs (namely, if NO), the procedure returns to step S8 to repeat the procedure from step S8.

Accordingly, the compressor driving means 120 drives the compressor 35, and at the same time, the motor driving means 122 drives the fan motor 39 to continuously cool the cold water in the cold water tank 7.

On the other hand, when the temperature Tc of the cold water is determined at step S10 as being lower than the established temperature Tcs (namely, if YES), the procedure proceeds to step S11.

At step S11, the control means 114 applies control signals to the compressor driving means 120 and the motor driving means 122 to stop the compressor 35 and the fan motor 39.

In accordance with the control signals from the control means 114, the compressor driving means 120 stops the compressor 35, and the motor driving means 122 stops the fan motor 39. Therefore, the cold water in the cold water tank 7 is no longer cooled.

At step S12, the hot water temperature sensing means 112 senses the temperature Th of the hot water in the hot water tank 9. Temperature data from the hot water temperature sensing means 112 is sent to the control means 114. The display means 128 displays the temperature Th of the hot water sensed by the hot water temperature sensing means 112 under the control of the control means 114.

It is then determined at step S13 whether or not the temperature Th of the hot water sensed by the hot water temperature sensing means 112 is higher than the established temperature Ths established by the temperature establishing means 105.

When the temperature Th of the hot water is determined as not being higher than the established temperature Ths (namely, if NO), the procedure returns to step S8 and repeatedly executes the procedure from step S8 until the temperature Th of the hot water in the hot water tank 9 is higher than the established temperature Ths.

On the other hand, when the temperature Th of the hot water is determined at step S13 as being higher than the established temperature Ths (namely, if YES), the procedure proceeds to step S14.

At step S14, the control means 114 applies a control signals to the heater operating means 124 to stop the operating of the heater 47.

In accordance with the control signal from the control means 114, the heater operating means 124 cuts off the source voltage being applied to the heater 47, thereby stop the operating of the heater 47.

Subsequently, at step S15, the water level sensing means 102 senses the amount of water stored in the water tank 3.

Water level data from the water level sensing means 102 is sent to the control means 114.

It is then determined at step S15 whether or not the water level of the water tank 3 sensed by the water level sensing means 102 is higher than a predetermined full water level.

As a result, when the water level of the water tank 3 is determined as not being higher than the predetermined full water level (namely, if NO), the procedure returns to step S6 and repeatedly executes the procedure from step S6 until the water level of the water tank 3 is higher than the predetermined full water level.

On the other hand, when the water level of the water tank 3 is determined at step S15 as being higher than the predetermined full water level (namely, if YES), the procedure proceeds to step S16.

At step S16, the control means 114 applies a control signal to the valve driving means 118 to close the water supply valve 81.

In accordance with the control signal from the control means 114, the valve driving means 118 cuts off the source voltage being applied to the water supply valve 81, thereby closing the water supply valve 81.

Subsequently, at step S17, the control means 114 applies a control signal to the pump driving means 116 to stop the pressure pump 33.

In accordance with the control signal from the control means 114, the pump driving means 116 cuts off the source voltage being applied to the pressure pump 33, thereby stopping the pressure pump 33.

In the closed state of the water supply valve 81, the supply of fresh water from the faucet to the water supply pipe is cut off. As a result, purified water is no longer supplied to the water tank 3.

Thus, the water purifying operation is completed.

Subsequently, a draining operation of the water purifier can be executed at step S18.

That is, it is determined whether or not the water discharge switch 107 of the key input means 104 has been manipulated, e.g., pressed, a first time.

When the water discharge switch 107 is determined at step S18 as being, a first time, pressed (namely, if YES), the procedure proceeds to step S19.

At step S19, the control means 114 sends, a control signal which is generated in accordance with the pressing of the water discharge switch 107, to the display means 128.

In accordance with the control signal, the display means 128 flashes the water discharge lamp on and off (not shown) for 3 seconds.

Therefore, it is thereafter possible to confirm that the water discharge switch has been, a first time, pressed.

That is, it is possible for the user to see that all purified water in the tanks 3, 7 and 9 is going to be discharged.

Subsequently, at step S20, it is determined whether or not the water discharge switch 107 has been pressed a second time within 3 seconds from the moment of the first pressing of the water discharge switch 107. If it has been pressed a second time (namely, if NO), then no water is discharged, as well be explained.

When the water discharge switch 107 is determined at step S20 as being, a second time, pressed (namely, if YES) within 3 seconds, the procedure proceeds to step S21.

At step S21, the control means 114 sends a control signal, which is generated in accordance with the press of the water discharge switch 107, to the display means 128 to display the water discharge operation.

In accordance with the control signal, the display means 128 turns on the water discharge lamp.

Thereafter, the procedure proceeds to step S22 whereby a control signal, which is generated from the control means 114 to discharge purified water in the tanks, 3, 7 and 9 is sent to the water discharge valve driving means 126.

Therefore, the water discharge valve driving means 126 supplies the source voltage to the water discharge valve 127 under the control of the control means 114, thereby opening the water discharge valve 127.

When the water discharge valve 127 is opened, purified water in the water tank 3, cold water in the cold water tank 7 and hot water in the hot water tank 9 are discharged through a water discharge pipe (not shown).

At step S23 it is determined whether or not the water discharge switch 107 is, a third time, pressed. If it has been pressed a third time (namely, if YES), then the discharge of water is stopped, as will be explained.

As a result, when the water discharge switch 107 is determined as not being, a third time, pressed (namely, if NO), the procedure proceeds to step S24.

At step S24 it is determined whether or not the water discharge operation has been executed for a predetermined time, that is, a time necessary to entirely discharge the water in the tanks.

When the water discharge operation is determined at step S24 as not having been executed for the predetermined time (namely, if NO), the procedure returns to step S22 and repeatedly executes the procedure from step S22 to entirely discharge the water from the tanks.

On the other hand, when the water discharge operation is determined at step S24 as having been executed for the predetermined time, the procedure proceeds to step S25 because the water in the tanks 3, 7 and 9 has been entirely discharged.

At step S25 the control means 114 applies a control signal to the water discharge valve driving means 126 to close the water discharge valve 127.

In accordance with the control signal from the control means 114, the water discharge valve driving means 126 cuts off the source voltage being applied to the water discharge valve 127, thereby closing the water discharge valve 127.

Subsequently, at step S26, the water level sensing means 102 senses the amount of water stored in the water tank 3, namely the water level of the water tank 3.

Water level data from the water level sensing means 102 is sent to the control means 114.

It is then determined at step S26 whether of not the water level of the water tank 3 sensed by the water level sensing means 102 is higher than a predetermined middle water level.

As a result, when the water level of the water tank 3 is determined at step S26 as not being higher than the predetermined middle water level (nomely, if NO), the procedure returns to step S4 and repeatedly executes the procedure from step S4 until the water level of the water tank 3 is higher than the predetermined middle water level.

On the other hand, when the water level of the water tank 3 is determined at step S26 as being higher than the predetermined middle water level (namely, if YES), the control means 114 applies, to the valve driving means, a control signal for closing the water supply valve therby stopping the supply of purified water to the water tank 3 at step S27.

Therefore, the valve driving means cuts off the source voltage being applied to the water supply valve.

In the closed state of the water supply valve, the supply of fresh water from the faucet to the water supply pipe is cut off.

As a result, purified water is no longer supplied to the water tank 3.

As noted earlier, if the water discharge switch 107 is determined at step S20 as not being, a second time, pressed within 3 seconds (namely, if NO), the procedure proceeds to step S29, thereby resetting the key signal of the water discharge switch 107.

Subsequently, the procedure proceeds to step S26 and repeatedly executes the procedure from the step S26 to determine the water level of the water tank 3.

Furthermore, when the water level of the water tank 3 is determined at step S3 as being higher than the predetermined low water level (namely, if YES), the procedure proceeds to step S8 and executes the procedure from step S8, thereby cooling and heating cold water in the cold water tank 7 and hot water in the hot water tank 9, respectively.

When the water discharge switch 107 is determined at step S18 as not being, a first time, pressed (namely, if NO), the procedure proceeds to step S26 and executes the procedure from step S26.

As noted earlier, when the water discharge switch 107 is determined at step S23 as being, a third time, pressed (namely, if YES), the procedure proceeds to step S25 and executes the procedure from step S25, thereby stopping the water discharge operation.

As is apparent from the above description, the present invention provides a water discharge control device for a water purifier and control method thereof, capable of preventing the water from being discharged from all of the tanks by mistake.

The foregoing description shows only preferred embodiments of the present invention.

Various other modifications are apparent to those skilled in the art without departing from the scope of the present invention which is only limited by the appended claims.

Therefore, the embodiments shown and described are only illustrative, not restrictive.

What is claimed is:

1. A water purifier comprising:
   a plurality of filters for purifying water;
   a main water tank for storing the purified water;
   a hot water tank and a cold water tank for receiving purified water from the main water tank;
   heating means and cooling means for heating and cooling water in the hot water tank and cold water tanks, respectively;
   water dispensing pipes connected to the hot water tank and cold water tank, respectively, for selectively dispensing hot or cold water to a user;
   a water discharge valve openable to drain all water from the main water tank, the hot water tank, and the cold water tank through a discharge pipe;
   a switch electrically connected to the water discharge valve and operable for opening the water discharge valve in response to the switch being manipulated two times within a predetermined time period; and
   a display operable for flashing a water discharge lamp on-and-off and initiating the predetermined time period in response to the switch being manipulated a first time, and for leaving the water discharge lamp on in response to the switch being manipulated a second time before the predetermined time period has expired.

2. A method of operating a water purifier, the water purifier comprising filters for purifying water, a main tank for storing purified water, a hot water tank and a cold water tank for receiving water from the main tank and cooling and heating, respectively, the received water, dispensing pipes for dispensing cooled water and heated water, respectively, an electrically actuated water discharge valve openable to drain all water from the main tank, hot water tank, and cold water tank through a discharge pipe, a switch electrically connected to the valve for opening and closing the valve, and a display having a water discharge lamp; the method comprising the steps of:

A. manipulating the switch a first time, causing the water discharge lamp to flash on and off and initiating a predetermined time period; and B. manipulating the switch a second time within the predetermined time period, causing the water discharge lamp to stay on and opening the valve.

3. The method according to claim 2 further including the step of manipulating the switch a third time, subsequent to the expiration of the predetermined time period and prior to a complete discharge of the main tank, hot water tank, and cold water tank, causing the valve to be closed.

* * * * *